United States Patent
Kleijn et al.

(10) Patent No.: US 11,978,464 B2
(45) Date of Patent: May 7, 2024

(54) TRAINED GENERATIVE MODEL SPEECH CODING

(71) Applicant: GOOGLE LLC, Mountain View, CA (US)

(72) Inventors: Willem Bastiaan Kleijn, Eastborne Wellington (NZ); Andrew Storus, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 133 days.

(21) Appl. No.: 17/757,122

(22) PCT Filed: Jan. 22, 2021

(86) PCT No.: PCT/US2021/070064
§ 371 (c)(1),
(2) Date: Jun. 9, 2022

(87) PCT Pub. No.: WO2022/159247
PCT Pub. Date: Jul. 28, 2022

(65) Prior Publication Data
US 2023/0352036 A1    Nov. 2, 2023

(51) Int. Cl.
*G10L 19/00* (2013.01)
*G10L 19/038* (2013.01)
(Continued)

(52) U.S. Cl.
CPC ............ *G10L 19/038* (2013.01); *G10L 19/04* (2013.01); *G10L 21/02* (2013.01); *G06N 3/02* (2013.01); *G10L 19/00* (2013.01)

(58) Field of Classification Search
CPC ............ G10L 19/00; G10L 21/02; G06N 3/02
See application file for complete search history.

(56) References Cited

U.S. PATENT DOCUMENTS

| | | | |
|---|---|---|---|
| 7,634,474 B2 | 12/2009 | Vassilvitskii et al. | |
| 2022/0103839 A1* | 3/2022 | Van Rozendaal | G06N 3/045 |
| 2023/0368804 A1* | 11/2023 | Kleijn | G10L 25/30 |

FOREIGN PATENT DOCUMENTS

| | | | |
|---|---|---|---|
| CN | 103456310 B | * | 2/2017 |
| CN | 107767409 A | | 3/2018 |

(Continued)

OTHER PUBLICATIONS

Fejgin, et al., "Source Coding of Audio Signals With a Generative Model," IEEE 2020. (Year: 2020).*

(Continued)

*Primary Examiner* — Feng-Tzer Tzeng
(74) *Attorney, Agent, or Firm* — Brake Hughes Bellermann LLP

(57) ABSTRACT

A method includes receiving sampled audio data corresponding to utterances and training a machine learning (ML) model, using the sampled audio data, to generate a high-fidelity audio stream from a low bitrate input bitstream. The training of the ML model includes de-emphasizing the influence of low-probability distortion events in the sampled audio data on the trained ML model, where the de-emphasizing of the distortion events is achieved by the inclusion of a term in an objective function of the ML model, which term encourages low-variance predictive distributions of a next sample in the sampled audio data, based on previous samples of the audio data.

19 Claims, 9 Drawing Sheets

(51) Int. Cl.
*G10L 19/04* (2013.01)
*G10L 21/02* (2013.01)
*G06N 3/02* (2006.01)

(56) References Cited

FOREIGN PATENT DOCUMENTS

| WO | 2004112001 A1 | 12/2004 | |
|---|---|---|---|
| WO | 2020047298 A1 | 3/2020 | |
| WO | WO-2020047298 A1 * | 3/2020 | ............. G10L 19/24 |

OTHER PUBLICATIONS

Kim, et al., "Reliable Estimation of Individual Treatment Effect with Causal Information Bottleneck," arXiv, 2019. (Year: 2019).*
Li, et al. "Gaussian process regression with heteroscedasticnoises—A machine-learning predictive variance approach," 2020. (Year: 2020).*
International Search Report and Written Opinion for PCT Application No. PCT/US2021/070064, dated Oct. 6, 2021, 11 pages.
Fejgin, et al., "Source Coding of Audio Signlas With a Generative Model", ICASSP 2020—IEEE International Conference on Acoustics, Speech and Signal Processing, May 4, 2020, pp. 341-345.

* cited by examiner

TRAINED GENERATIVE MODEL SPEECH CODING

CROSS REFERENCE TO RELATED APPLICATION

This application is a 35 U.S.C. § 371 National Phase Entry Application from PCT/US2021/070064, filed Jan. 22, 2021, designating the U.S., the disclosure of which is incorporated herein by reference in its entirety.

FIELD

Embodiments relate to encoding, communicating, and decoding an utterance in a communications environment (e.g., application).

BACKGROUND

Audio codecs can be used for compressing speech in a communications application (e.g., as executed on a mobile computing device). However, these audio codecs may not compress speech to a desirable size for minimizing bandwidth usage (e.g., bit rate) in a communications network. The possibility of using a machine-learning based generative model as an audio codec suggests further compression is possible resulting in a reduction in size and bandwidth usage (e.g., bit rate) for speech applications. However, successfully training machine-learning based generative models that can handle speech from a wide variety of speakers and speech uttered in a wide variety of environments can be difficult.

SUMMARY

In a general aspect, a method includes receiving sampled audio data corresponding to utterances and training a machine learning (ML) model, using the sampled audio data, to generate a high-fidelity audio stream from a low bit rate input bitstream. The training of the ML model includes de-emphasizing the influence of low-probability distortion events in the sampled audio data on the trained ML model, where the de-emphasizing of the distortion events is achieved by the inclusion of a term in an objective function of the ML model, which term encourages low-variance predictive distributions of a next sample in the sampled audio data, based on previous samples of the audio data.

Example implementations can include one or more of the following features, alone or in any combination with each other.

In a first example, the term that encourages low-variance predictive distributions of a next bit in the generated bitstream can include a regularization term.

In a second example, the regularization term can be defined as:

$$J_{var}(\{x\}, W) = E_{data} \sigma_q^2, \text{ where}$$

W represents a vector of network parameter weights,
{x} represents a sequence of the sampled audio data,
$E_{data}$ indicates averaging of a set of data in a database including the sampled audio data, and
$\sigma_q^2$ is predictive variance.

In a third example, the regularization term can include a logarithm as a monotonically increasing function of a predictive variance.

In a fourth example, the regularization term can be defined as:

$$J_{var}(\{x\}, W) = E_{data} \log(\sigma_q + a), \text{ where}$$

W represents a vector of network parameter weights,
{x} represents a sequence of the sampled audio data,
$E_{data}$ indicates averaging of a set of data in a database including the sampled audio data,
$\sigma_q$ represents predictive variance, and
a represents a floor.

In a fifth example, the objective function can include a log-likelihood objective function and a regularization term, and the training of the ML model can include selecting weights of a network that minimize a predictive variance associated with the regularization term.

In a sixth example, the ML model can be a regressive network.

In a seventh example, prior to training the ML model, the sampled audio data can be separated in the time domain, the separated sampled audio data can be converted to a sequence of speech parameter vectors, the sequence of speech parameter vectors can be transformed, and the transformed sequence of speech parameter vectors can be quantized.

In another general aspect, a method of communicating an audio bitstream includes: receiving, at a first device, sampled first audio data corresponding to first utterances; converting the sampled first audio data into sequences of speech parameter vectors; creating a first bitstream representing the utterances by quantizing transformed sequences of the speech parameter vectors; communicating, by the first device to a second device, the first bitstream; receiving, at the first device from the second device, a second bitstream representing second utterances; creating a sequence of speech parameter vectors based on the second bitstream; creating a vector sequence based on inversely transforming the sequence of speech parameter vectors; generating, based on the vector sequence and by using a trained machine learning (ML) model, a high fidelity audio stream representing the second utterances, where the training of the ML model includes de-emphasizing the influence of low-probability distortion events in sampled training audio data on the trained ML model, where the de-emphasizing of the distortion events is achieved by the inclusion of a term in an objective function of the ML model, which term encourages low-variance predictive distributions of a next sample in the sampled training audio data, based on previous samples of the audio data.

Example implementations can include one or more of the following features, alone or in any combination with each other.

In an eighth example, the term that encourages low-variance predictive distributions of a next sample in the sampled training audio data can include a regularization term.

In a ninth example, the regularization term can be defined as:

$$J_{var}(\{x\}, W) = E_{data} \sigma_q^2, \text{ where}$$

W represents a vector of network parameter weights,
{x} represents a sequence of the sampled audio data,
$E_{data}$ indicates averaging of a set of data in a database including the sampled audio data, and
$\sigma_q^2$ is predictive variance.

In a tenth example, the regularization term can include a logarithm as a monotonically increasing function of a predictive variance.

In an eleventh example, the regularization term can be defined as:

$$J_{var}(\{x\}, W) = E_{data} \log(\sigma_q + a), \text{ where}$$

W represents a vector of network parameter weights,
{x} represents a sequence of the sampled audio data,
$E_{data}$ indicates averaging of a set of data in a database including the sampled audio data,
$\sigma_q$ represents predictive variance, and
a represents a floor.

In a twelfth example, the objective function can include a log-likelihood objective function and a regularization term and the training of the ML model can include selecting weights of a network that minimize a predictive variance associated with the regularization term.

In a thirteenth example, the ML model can be a regressive network.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. The use of similar or identical reference numbers in the various drawings is intended to indicate the presence of a similar or identical element or feature.

DETAILED DESCRIPTION OF THE EMBODIMENTS

The possibility of using a machine-learning based generative model as an audio codec suggests further compression is possible resulting in a reduction in size and bandwidth usage (e.g., bit rate) for speech applications. However, the performance of generative models can deteriorate with distortions that can exist in real-world input signals. For example, a technical problem with generative synthesis is that it can be sensitive to the quality of the data used for training and to the conditioning sequences used for training and inference. This deterioration can be caused by the sensitivity of the maximum likelihood criterion to outliers in the training data (e.g., noise events that are uncorrelated with the speech to be modeled), resulting in poor synthesized speech quality.

Example implementations of the techniques described herein relate to a technical solution in which predictive-variance regularization is used to reduce the sensitivity of the maximum likelihood criterion to outliers. The use of predictive-variance regularization can result in an increase in the performance of one or more generative models as an audio codec (e.g., the synthesis of an utterance by the generative model can better represent the original speech). Example implementations can use noise reduction to remove unwanted signals (e.g., during model training) to increase performance of generative models as an audio codec for bit rates as low as, for example, 3 kb/s for real-world speech signals at reasonable computational complexity (e.g., to minimize processor usage).

Figure 1:
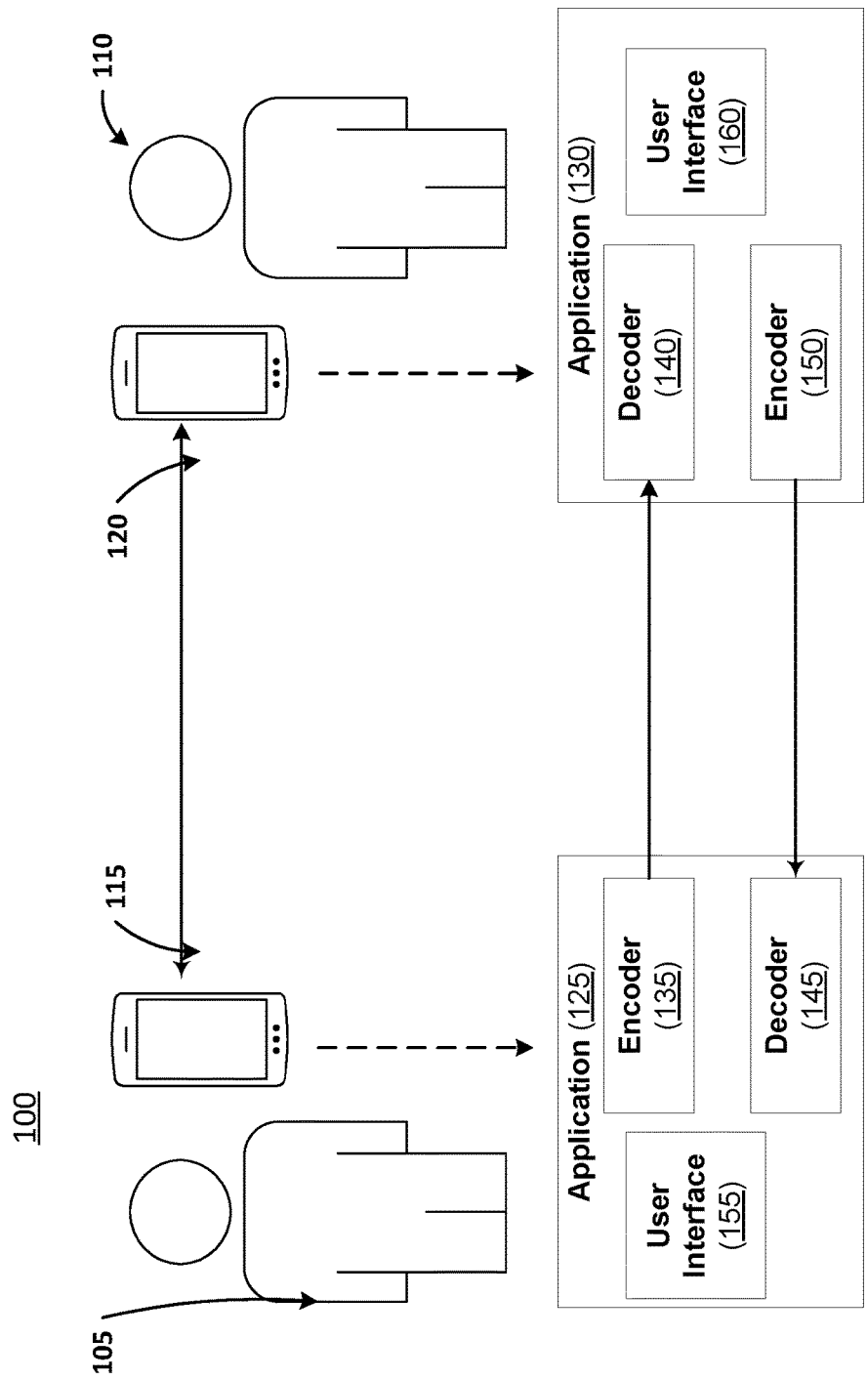
FIG. 1 illustrates a pictorial representation and a block diagram of a portion of a communication system according to at least one example embodiment.

FIG. 1 illustrates a pictorial representation and a block diagram of a portion of a communication system according to at least one example embodiment. As shown in FIG. 1, a communication system 100 includes a first computing device 115 operated by a first user 105 and a second computing device 120 operated by a second user 110. The first computing device 115 and the second computing device 120 can be communicatively coupled via, for example, an Internet.

The first computing device 115 can include an application 125 including an associated encoder 135 and an associated decoder 145, and the second computing device 120 can include an application 130 including an associated encoder 150 and an associated decoder 140. The encoder 135, 150 and the decoder 140, 145 can be pre-installed on the corresponding computing device 115, 120 and/or installed on the corresponding computing device 115, 120 with installation of the associated application 125, 130. For example, the encoder 135, 150 and the decoder 140, 145 can include an audio and/or video codec that is pre-installed on the corresponding computing device 115, 120 and/or installed on the corresponding computing device 115, 120 with installation of the associated application 125, 130.

The application 125 can be communicatively coupled with the application 130 via the coupling of the first computing device 115 and the second computing device 120. For example, data generated by the encoder 135 (e.g., a bitstream) can be communicated to the decoder 140 and data generated by the encoder 150 (e.g., an audio bitstream) can be communicated to the decoder 145. The encoder 135, 150 can be configured to compress (e.g., encode) an utterance by the corresponding user 105, 110 as captured using, for example, a microphone of the computing device 115, 120. The compressed utterance can have a small size (e.g., memory usage) such that low bit rates (e.g., small bandwidth utilization) can be achieved between the computing device 115 and the computing device 120.

The application 125, 130 can include a user interface 155, 160. The user interface 155, 160 can be configured to provide an interface with user 105, 110. For example, the user interface 155, 160 can be configured to initiate and control the communication between computing device 115 and computing device 120. The user interface 155, 160 can be configured to capture and display audio and/or video as captured using components of computing device 115, 120. The user interface 155, 160 can be configured to control audio and/or video (e.g., mute, background modification, camera on/off, and the like). The user interface 155, 160 can be configured to provide other communication operations (e.g., chat). The user interface 155, 160 can be configured to be an audio communication (e.g., phone call, short range private communication (e.g., walkie-talkie), and the like) application. The user interface 155, 160 can be configured to be an audio device (e.g., streaming music, broadcast audio, podcast, and the like), a video device (e.g., streaming video), and/or the like. Any of the functions of the user interface 155, 160 can include the use of the techniques/implementations described below.

The decoder 140, 145 can include an audio codec including a generative model for decoding an audio stream. Accordingly, the encoder 135, 150 can include an audio codec to compress audio such that the compressed audio can be decompressed (e.g., decoded, synthesized) using a generative model. The generative model can be a machine learned (e.g., trained) generative model. The generative model can be trained using a noise reduction technique to remove unwanted signals in audio before and/or during the training of the generative model. Training the model using predictive variance regularization is described in more detail below.

An example implementation can include the identification of causes of the sensitivity (e.g., audio noise) to distortion when training the model and techniques to reduce this sensitivity (e.g., reduce the impact of the audio noise on the performance of the trained model). A cause of the sensitivity can be associated with an attribute of the log-likelihood (LL) objective function. The LL objective function can incur a relatively high penalty if the model assigns a low probability to observed data. Therefore, in the context of an autoregressive structure, the LL objective function can encourage an overly broad predictive distribution when at least some training data are difficult to predict accurately from the past signal and conditioning, which is the case for real-world training data that includes random or unusual noise events. This effect can be mitigated (e.g., reduced) by including predictive variance regularization in the overall objective function used to train the machine learning model. To prevent the need for simultaneous modeling of independent signals, example implementations can, at lower signal-to-noise ratios, apply noise reduction techniques prior to extracting the features that are used for conditioning.

To understand how an autoregressive model is used to model a process, consider a random process $\{X_i\}$ that consists of real-valued random samples $X_i$, with a time index $i \in Z$. The joint distribution of a finite sequence, $p(x_i, \ldots, x_{i-N})$, can be expressed as a product of conditional distributions:

$$p(\beta) = \prod_{j=0}^{N} p(x_{i-j-1}, \ldots, x_{i-N}, \beta), \quad (1)$$

where $\beta$ represents conditioning information.

It follows from eqn. (1) that an approximate realization of a random process can be created by recursively sampling from a model of the predictive distribution $p(x_i|x_{i-1} \ldots, x_{i-N}, \beta)$ for sufficiently large N. A standard-form distribution $q(x_i|\alpha)$ with parameters $\alpha$ can be used as a model predictive distribution. The standard-form distribution can be, for example, a Gaussian or a logistic mixture. This formulation can enable prediction of the model parameters with a deterministic neural network $\phi: (x_{i-1}, \ldots, x_{i-N}, \beta, W) \mapsto \alpha$ where W is a vector of network parameters. Thus, the predictive distribution for sample $x_i$ can be $q(x_i|\phi(x_{i-1}, \ldots, x_{i-N}\beta, W))$.

To find the parameters W, a reasonable objective can be to minimize the Kullback-Leibler divergence between the ground-truth joint distribution $p(x_i, \ldots, x_{i-N})$ and the model distribution $q(x_i, \ldots, x_{i-N})$, or, equivalently, the cross-entropy between these distributions. The latter measure can be tractable even though p may only be available as an empirical distribution. It follows from eqn. (1) and the formulation of $q(x_i|\alpha)$ that cross-entropy based estimation of the parameters of $\phi$ can be implemented using maximum-likelihood based teacher forcing. For M signal samples, the maximum-likelihood estimate of W can be written as:

$$W^* = \sum_{i=1}^{M} \log [q(x_i | \phi(x_{i-1}, \ldots, x_{i-N}, \beta, W))]. \quad (2)$$

Note that eqn. (2) can lead to rapid training as it facilitates parallel implementation.

For sufficiently large N and M, the LL objective can provide an upper bound on the differential entropy rate as:

$$h(X_{i-j}, \ldots, X_{i-N}) \leq -\frac{1}{M} \sum_{i=1}^{M} \log[q(x_i | \phi(x_{i-1}, \ldots, x_{i-N}, W))], \quad (3)$$

where, for notational convenience, the unconditioned case is considered.

Conversely, eqn (3) can be interpreted as a lower bound on a measure of uncertainty associated with the model predictive distribution. This lower bound is associated with the process itself and not with the model. Although the differential entropy rate can be subadditive for summed signals, predictive models may not work well for summed signals. In general, a model of summed signals can be multiplicative in the required model configurations. The sum of finite-order linear autoregressive models may not be a finite-order autoregressive model. This problem can be reduced with noise suppression.

A challenging problem relates to drawbacks of the Kullback-Leibler divergence, and, hence, the LL objective of eqn (2). When the model distribution q vanishes in the support region of the ground-truth p, the Kullback-Leibler divergence can diverge. In eqn (2) this divergence can manifest as a penalty for training data $x_i$ that have a low model probability $q(x_i|\phi(x_{i-1}, \ldots, x_{i-N}, \beta, W))$. Hence, a few nonrepresentative outliers in the training data may lead the training procedure to equip the predictive model distribution with heavy tails (e.g., data outside a primary frequency). Such tails can lead to signal synthesis with a relatively high entropy rate during inference. In audio synthesis, the relatively high entropy rate can correspond to a noisy synthesized signal. Therefore, it may be desirable to counter the severity of the penalty for low probability training data.

There can be a second relevant drawback to the machine learned (ML) objective. When the ML objective function is used, the model distribution should converge to the ground-truth distribution with an increasing data sample size. However, in practice, the stochastic nature of the training data and the training method can result in inaccuracies. Therefore, the method can attempt to minimize the impact of such errors. For example, the implicit description of pitch by the predictive distribution may be inaccurate. A predictive model distribution with heavy tails for voiced speech then increases the likelihood of training data as it reduces the impact of the model pitch deviating from the ground-truth pitch. From this reasoning, accounting for the audibility (perception) of distortions leading to empirically motivated refinements of the objective function may be desirable.

Two related techniques can modify the maximum likelihood criterion to obtain improved performance. Both techniques can reduce the impact of data points in the training set that are difficult to predict, and the techniques can remove the need for heuristic modifications during inference.

A first technique for modifying the maximum likelihood criterion can be to add a term to the objective function that encourages low-variance predictive distributions. In this approach the overall objective function can be defined for the weights W given a database {x} as:

$$J(\{x\},W)=J_{LL}(\{x\};W)+v_{var}(\{x\},W), \quad (4)$$

where the log likelihood over the database, $$J_{LL}(\{x\};W)=E_{data} \log q(x_i;\phi(x_{i-1},\ldots,x_{i-N},W)),$$

is combined with a variance regularization term $J_{var}(\{x\},W)$ that is defined below and where v is a constant that can be tuned.

The variance of the predictive distribution can be an instantaneous parameter that varies over a set of data, and $J_{var}(\{x\},W)$ can be an average over the predictive distributions. The predictive distribution of each sample can have a distinct variance, and the averaging method can be selected to have properties that can be advantageous for the specific application. As discussed above, the predictive distribution can be a standard-form distribution $q(x|\alpha)$.

The predictive distribution $q(x|\alpha)$ can be a mixture distribution. Therefore, an expression for the variance of a mixture distribution should be determined. The mean of a mixture distribution can be:

$$\mu = E_q[X] = \sum_{k=1}^{K} \gamma_k E_{q_k}[X] = \sum_{k=1}^{K} \gamma_k \mu_k, \quad (5)$$

where $E_q$ is the expectation over q and $q_k=\breve{q}(\bullet; \mu_k, s_k)$, with $\breve{q}$ a mixture component.

The variance of the mixture distribution can be:

$$E_q[(X-E_q[X])^2]=\Sigma_{k=1}^{K}\gamma_k(\sigma_k^2+\mu_k^2+\mu^2). \quad (6)$$

Considering the specific case of a mixture of logistics in more detail, the logistic distribution for component k can be expressed as:

$$\breve{q}(x; \mu_k, s_k) = \frac{\exp-\left(\frac{x-\mu_k}{s_k}\right)}{s_k\left(1+\exp\left(\frac{x-\mu_k}{s_k}\right)\right)^2} \quad (7)$$

where $s_k$ is the scale and $\mu_k$ is an offset.

The logistic distribution can be symmetric around μ, and therefore, μ is the distribution mean. The variance of the logistic distribution can be expressed as:

$$E_{X\sim\breve{q}}\left[\left(X-E_{X\sim\breve{q}}[X]\right)^2\right] = \frac{s^2\pi^2}{3} \quad (8)$$

The variance of the mixture of logistics model can be a combination of eqn. (6) and eqn. (8):

$$\sigma_q^2 = \sum_{k=1}^{K} \gamma_k\left(\frac{s_k^2\pi^2}{3}+\mu_k^2\right) - \left(\sum_{k=1}^{K} \gamma_k\mu_k\right)^2 \quad (9)$$

A technique for reducing the prediction variance can be to use the prediction variance eqn. (9) directly as variance regularization in the objective function eqn. (4):

$$J_{var}(\{x\},W)=E_{data}\sigma_q^2, \quad (10)$$

where $E_{data}$ indicates averaging over the set of data.

Weights W of the network φ that minimize $\sigma_q^2$ can be selected. Optimization of eqn. (10) over a set of data may result in the prediction variance being reduced for signal regions where the conditional differential entropy eqn. (3) is large. The conditional differential entropy can be decomposed into the sum of a scale-independent term and a logarithmic scale (signal variance) dependency. For speech, the scale independent term can be large for an unvoiced segment, while the scale-dependent term can be large for voiced speech.

For signals that have uniform overall signal variance, setting low predictive variance for regions that have relatively low conditional differential entropy may be desirable (e.g., for speech that would correspond to encouraging low variance for voiced speech only). This can be accomplished by a monotonically increasing concave function of the predictive variance. The logarithm can be used for this purpose because the logarithm can be invariant with scale. The effect of a small variance getting smaller can equal that of a large variance getting smaller by the same proportion. Therefore:

$$J_{var}(\{x\},W)=E_{data}\log(\sigma_q+a) \quad (11)$$

can be used, with a providing a floor.

A second technique for modifying the maximum likelihood criterion to prevent the vanishing support problem of the Kullback-Leibler divergence can be to use a baseline distribution. For example, using a mixture distribution of the form:

$$q_{train}(x_i; \phi) = \gamma_0\breve{q}(\alpha_0) + \sum_{k=1}^{K} \gamma_k\breve{q}(x_i; \phi(x_{i-1},\ldots,x_{i-N},\beta,W_k)) \quad (12)$$

where the parameters $\alpha_0$ are set by the designer and where the first term is omitted during inference (the other terms can be renormalized by a factor $\gamma_k/(1-\gamma_0)$.

By selecting $\alpha_0$ to provide an overly broad distribution, the distribution used for inference can be of a low variance.

In an example implementation, consider an input signal with a sampling rate S Hz. To avoid the need for modeling summed independent signals, the input can be pre-processed with a real-time TasNet at inference. An encoder can convert the signal into a sequence of log mel-spectra. A set of subsequent log mel-spectra can be stacked into a supervector that can be subjected to a Karhunen-Loève transform (KLT). The transformed stacked log mel-spectra can be encoded using split-vector quantization with a small number of coefficients per split. In the example implementation, no other information may be encoded.

A decoder can decode the bitstream into a sequence of quantized log mel-spectra. These spectra can form the input to a conditioning stack, including a set of one-dimensional (1D) convolutional layers. The 1D convolutional layers can include dilation except for the first convolutional layer. The output can be a vector sequence with a dimensionality equal to a gated recurring unit (GRU) state and a sampling rate can be equal to that of the mel-spectra of the encoder.

An autoregressive network can include a multi-band WaveGRU that is based on gated recurring units. For an N-band WaveGRU, N samples can be generated simultaneously at an update rate of S/N Hz, one sample for each frequency band. For each update, the state of the GRU network can be projected onto an N×K×3 dimensional space that defines N parameter sets. Each of the parameter sets can correspond to a mixture of logistics for a band. The value of a next signal sample for each band can be drawn by first selecting the mixture component (e.g., a logistics distribution) according to the bands probability and then drawing the sample from this logistics distribution by transforming a sample from a uniform distribution. For each set of N samples, a synthesis filter-bank can generate N subsequent time-domain samples. The time-domain samples can result in an output with sampling rate S Hz.

The input to the WaveGRU can include the addition of autoregressive and conditioning components. The autoregressive component can be a projection of the last N frequency-band samples projected onto a vector of the dimensionality of the WaveGRU state. The second component can be the output of the conditioning stack (e.g., at a dimensionality of the WaveGRU state), repeated in time to obtain the correct sampling rate of S/N Hz.

The training of the GRU network and the conditioning stack can be performed simultaneously using teacher forcing. In other words, the past signal samples that are provided as input to the GRU can be ground-truth signal samples. The objective function eqn. (10), combining log likelihood (cross entropy) and variance regularization, can be used for each subsequent signal sample.

Figure 2A:
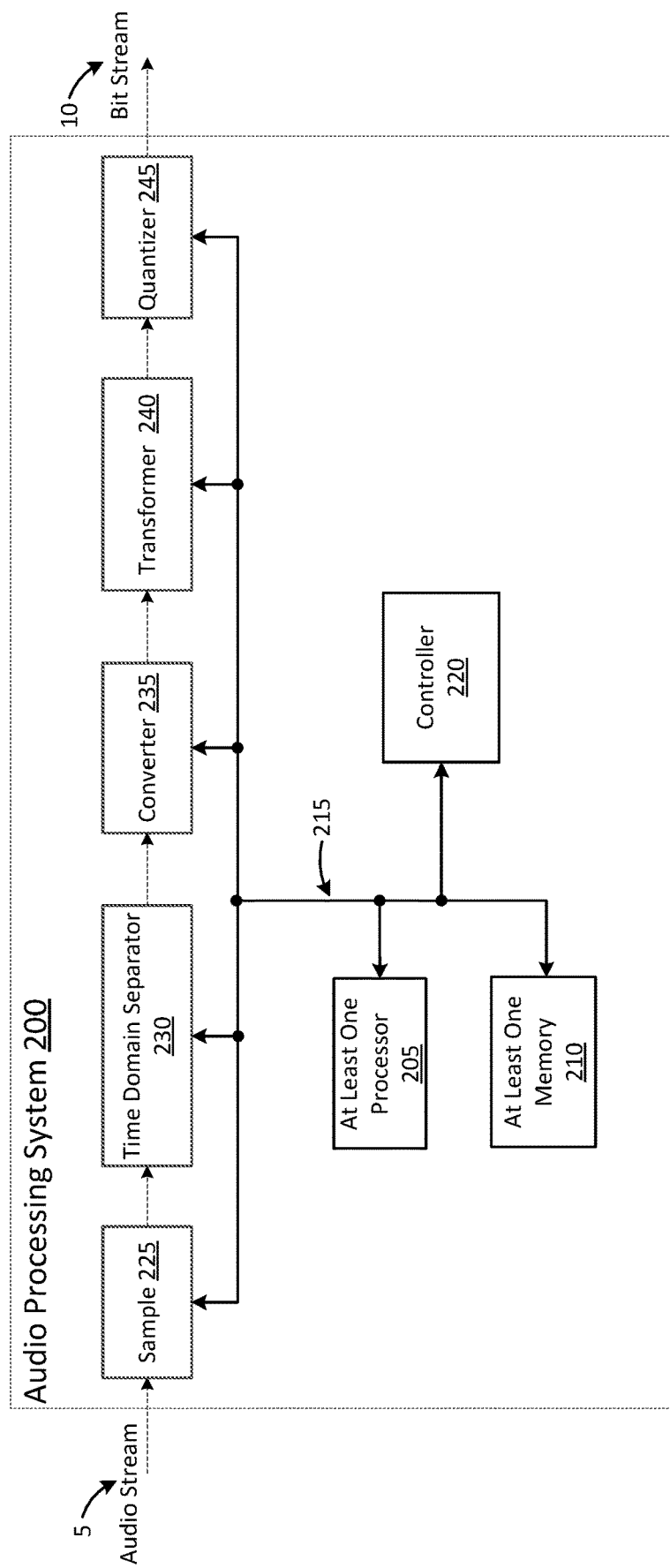
FIGS. 2A and 2B illustrate a block diagram of an audio processing system according to at least one example embodiment.
Figure 2B:
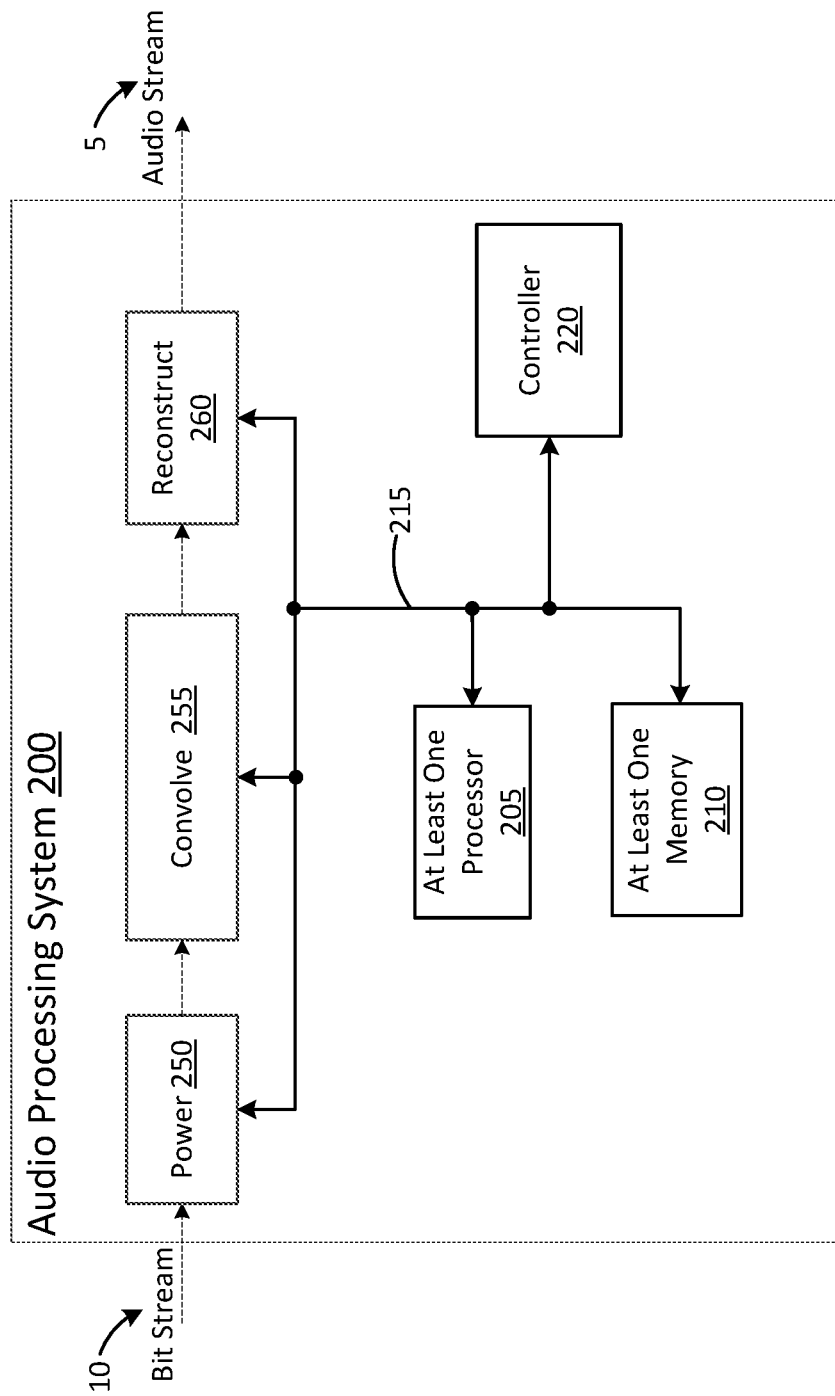

FIGS. 2A and 2B illustrate a block diagram of an audio processing system according to at least one example embodiment. As shown in FIGS. 2A and 2B, an audio processing system 200 includes at least one processor 205, at least one memory 210, and a controller 220. FIG. 2A illustrates components of the system 200 used to encode an audio signal into a bitstream at a computing device for transmission from the computing device to another computing device. FIG. 2B illustrates components of the system 200 used to decode a bitstream received at a computing device from another computing device and to reconstruct/synthesize an audio signal from the decoded bitstream. The components of system 200 can be included in computing devices 115 and 120, such that devices 115 and 120 can both process audio signals for transmission as bitstreams to another device and can receive bitstreams from another device and process the received bitstreams to synthesize an audio signal for rendering to a user. As shown in FIG. 2A, the audio processing system 200 can include a sample 225 block, a time domain separator 230 block, a converter 235 block, a transformer 240 block, and a quantizer 245 block. As shown in FIG. 2B, the audio processing system 200 can include a power 250 block, a convolve 255 block, and a reconstruct 260 block. The at least one processor 205, the at least one memory 210, the controller 220, the sample 225 block, the time domain separator 230 block, the converter 235 block, the transformer 240 block, the quantizer 245 block, the power 250 block, the convolve 255 block, and the reconstruct 260 block are communicatively coupled via bus 215. In FIGS. 2A and 2B solid lines represent control links and dashed lines represent data links.

The at least one processor 205 may be utilized to execute instructions stored on the at least one memory 210, so as to thereby implement the various features and functions described herein, or additional or alternative features and functions. The at least one processor 205 may be a general-purpose processor. The at least one processor 205 may be a graphics processing unit (GPU) and/or an audio processing unit (APU). The at least one processor 205 and the at least one memory 210 may be utilized for various other purposes. In particular, the at least one memory 210 can represent an example of various types of memory and related hardware and software which might be used to implement any one of the modules described herein.

The at least one memory 210 may be configured to store data and/or information associated with the audio processing system 200. For example, the at least one memory 210 may be configured to store code associated with implementing a communications application including a codec that uses a regressive (e.g., autoregressive) model. For example, the at least one memory 210 may be configured to store code associated with encoding/decoding audio data (e.g., an audio stream or utterance) using a regressive (e.g., autoregressive) model. The at least one memory 210 may be a non-transitory computer readable medium with code that when executed by the processor 205 causes the processor 205 to implement one or more of the techniques described herein. The at least one memory 210 may be a shared resource. For example, the audio processing system 200 may be an element of a larger system (e.g., a server, a personal computer, a mobile device, and the like). Therefore, the at least one memory 210 may be configured to store data and/or information associated with other elements (e.g., web browsing, camera, games, and/or the like) within the larger system.

The controller 220 may be configured to generate various control signals and communicate the control signals to various blocks in the audio processing system 200. The controller 220 may be configured to generate the control signals to implement the techniques described herein. The controller 220 may be configured to control data for a codec based on a regressive model.

Referring to FIG. 2A, an audio stream 5 is input to the audio processing system 200. The audio processing system 200 can be configured to generate a bitstream 10 (e.g., a compressed audio bitstream) based on the audio stream 5. The bitstream 10 can be communicated as an operation of a communication application. For example, the bitstream 10 can be communicated from device 115 to device 120 using application 125, 130. For example, the bitstream 10 can be communicated from device 120 to device 115 using application 125, 130.

The sample 225 block can be configured to sample the audio stream 5. Sampling can include using a sampling rate of S Hz to generate a discrete-time signal representing the audio stream 5. The sampling rate can be directly proportional to the bit rate. Therefore, the lower the sampling rate the lower the bit rate. Therefore, the sampling rate can cause a compression of the audio stream 5. In other words, the lower the sampling rate S, the more compressed (holding the bit depth or the number of bits used to store the sampled audio stream 5 constant) the audio stream 5 may be. Therefore, the sampling rate S can be selected to enable (or help enable) the bit rate of the audio stream to be as low as, for example, 3 kb/s.

The time domain separator 230 block can be configured to separate speech, so as to avoid the need for modeling summed independent signals. In some implementations, the sampled audio stream 5 can be processed to separate independent speech signals in the sampled audio stream 5 and/or to suppress noise in the separated independent speech signals. In some implementations, a real-time TasNet (time-domain audio separation network) can apply a set of weighting functions (or masks) to the sampled audio stream 5 to separate speech and to perform noise suppression. In other words, to separate each speaker that may be heard in an utterance represented by the sampled audio stream 5, a weighted mask can be applied to the sampled audio stream. In some implementations, a TasNet with only one output channel can be used to suppress noise and to remove all but one speech channel by masking out by multiplying components (of a learned representation) that are not attributed to the one speech signal. The result can be that the user (e.g., user 105, 110) can be the focus of the audio processing system 200 by using a mask to isolate the user and filter out any background voices.

The converter 235 block can be configured to parameterize the separated audio stream. In example implementations, the separated audio stream can be converted into a sequence of log mel-spectra, and these spectra can form the input to a conditioning stack, including a set of one-dimensional (1D) convolutional layers. A log mel-spectra can be a representation of the short-term power spectrum of the separated audio stream 5, based on a linear cosine transform of a log power spectrum on a nonlinear mel scale of frequency. A set of the resultant log mel-spectra can be stacked into a supervector. To quantify speech (e.g., an utterance) associated with the user (e.g., user 105, 110) the log mel-spectra can be adapted to a Gaussian mixture model to fit the user effectively shifting the means to some direction. The adaptation direction is a real valued vector that characterizes the user. This is sometimes called a supervector.

The transformer 240 block can be configured to apply a Karhunen-Loève transform (KLT) to the log mel-spectra (e.g., the supervector) corresponding to the audio stream 5. The KLT is a linear transform where the basis functions are taken from the statistics of the signal (e.g., the log mel-spectra or supervector). The KLT can be an adaptive transform (e.g., adapted to the audio power). The KLT can be an optimal transform as relates to energy compaction. In other words, the KLT can place as much energy as possible into as few coefficients as possible.

The quantizer 245 block can be configured to quantize the energy (e.g., power or coefficients) associated with the transformed audio stream 5. For example, the transformed stacked log mel-spectra are encoded using split-vector quantization with a small number of coefficients per split. Quantization of energy can refer to assigning the energy (e.g., the transformed stacked log mel-spectra) to discrete energy levels. In split-vector quantization coefficients of the log mel-spectra or supervector can be split into p equal size groups. If the groups cannot be of equal size, then either the remaining coefficients can be added to one of the groups or the remaining coefficients can be put in their own smaller group.

Referring to FIG. 2B, a bitstream 10 is input to the audio processing system 200. The audio processing system 200 can be configured to synthesize the audio stream 5 (e.g., as a reconstructed audio stream) based on the received bitstream 10. The audio stream 5 can be synthesized (e.g., reconstructed) based on the bitstream 10 using a generative model. The bitstream 10 can be received as an operation of a communication application. For example, the bitstream 10 can be received by device 115 from device 120 using application 125, 130. For example, the bitstream 10 can be received by device 120 from device 115 using application 125, 130.

The power 250 block can be configured to generate a sequence of quantized log mel-spectra based on the bitstream 10. The sequence of quantized log mel-spectra should substantially match the transformed stacked log mel-spectra input to the quantizer 245 for at least a portion of bitstream 10 corresponding to at least a portion of audio stream 5.

The convolve 255 block can be configured to generate a vector sequence based on the quantized log-mel spectra. The sequence of quantized log-mel spectra can be the input to a conditioning stack, including a set of one-dimensional (1D) convolutional layers. The 1D convolutional layers can include dilation except for the first convolutional layer. The output can be the vector sequence with a dimensionality equal to a gated recurring unit (GRU) state and a sampling rate can be equal to that of the mel-spectra of the encoder.

The reconstruct 260 block can be configured to generate an audio stream reconstruction of a corresponding encoded audio stream (e.g., a bitstream). The reconstruct 260 block can be configured to use a regressive (e.g., autoregressive) network to generate the audio stream reconstruction (e.g., reconstructed audio stream 5). The regressive network can include a multi-band WaveGRU that is based on gated recurring units. For an N-band WaveGRU, N samples can be generated simultaneously at an update rate of S/N Hz, one sample for each frequency band. For each update, the state of the GRU network can be projected onto an N×K×3 dimensional space that defines N parameter sets. Each of the parameter sets can correspond to a mixture of logistics for a band. The value of a next signal sample for each band can be drawn by first selecting the mixture component (e.g., a logistics distribution) according to the bands probability and then drawing the sample from this logistics distribution by transforming a sample from a uniform distribution. For each set of N samples, a synthesis filter-bank can generate N subsequent time-domain samples. The time-domain samples can result in an output (e.g., reconstructed audio stream 5 or an utterance) with sampling rate S Hz.

Figure 3:
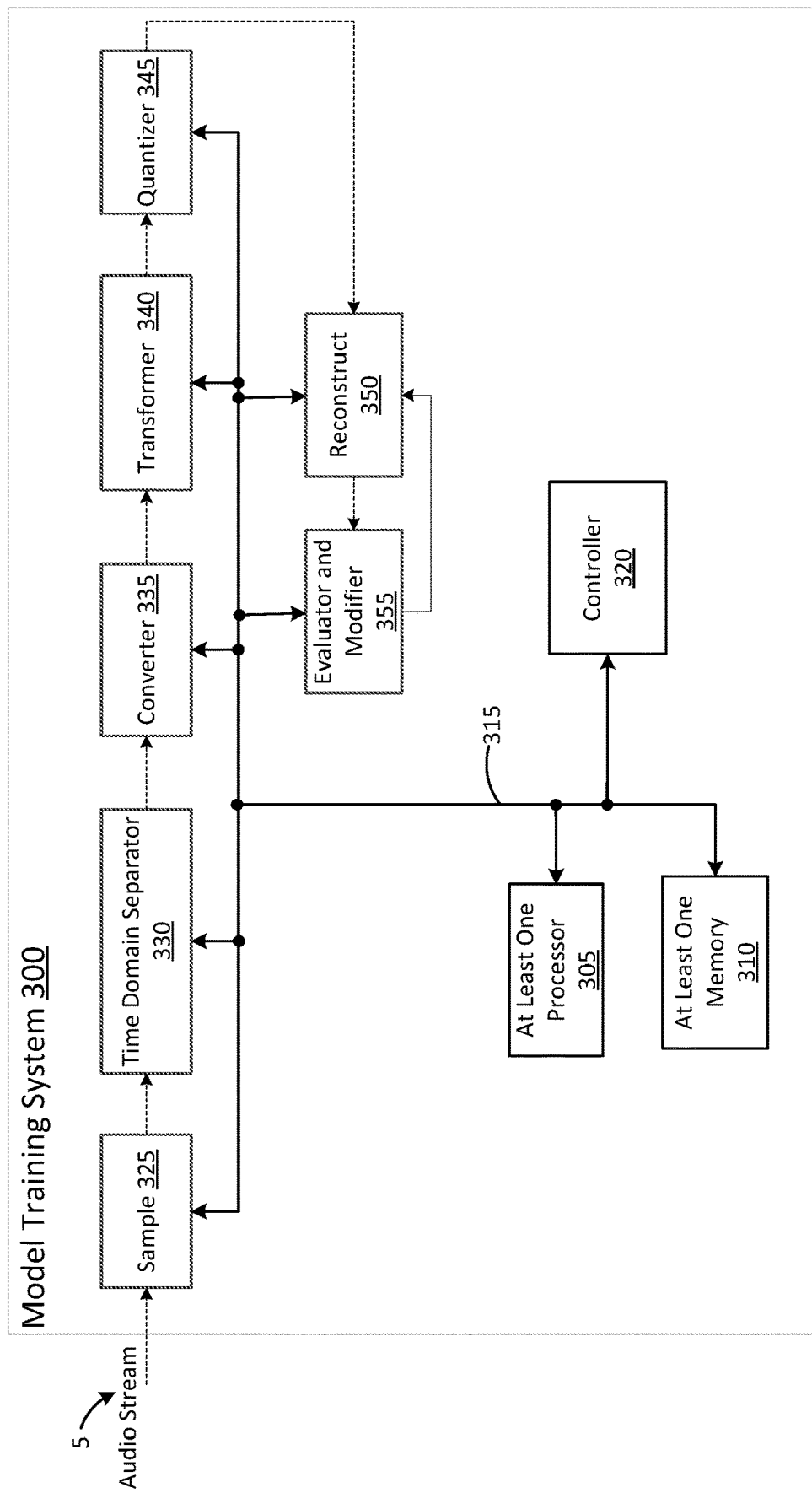
FIG. 3 illustrates a block diagram of a model training system according to at least one example embodiment.

FIG. 3 illustrates a block diagram of a model training system according to at least one example embodiment. As shown in FIG. 3, a model training system 300 includes at least one processor 305, at least one memory 310, a controller 320, a sample 325 block, a time domain separator 330 block, an evaluator and modifier 335 block, a transformer 340 block, a quantizer 245 block, a reconstruct 350 block, and a compare 355 block. The at least one processor 305, the at least one memory 310, the controller 320, the sample 325 block, the time domain separator 330 block, the converter 335 block, the transformer 340 block, the quantizer 245 block, the reconstruct 350 block, and the evaluator and modifier 355 block are communicatively coupled via bus 315. In FIG. 3 solid lines represent control links and dashed lines represent data links.

The at least one processor 305 may be utilized to execute instructions stored on the at least one memory 310, so as to thereby implement the various features and functions described herein, or additional or alternative features and functions. The at least one processor 305 may be a general-purpose processor. The at least one processor 305 may be a graphics processing unit (GPU) and/or an audio processing unit (APU). The at least one processor 305 and the at least one memory 310 may be utilized for various other purposes. In particular, the at least one memory 310 can represent an example of various types of memory and related hardware and software which might be used to implement any one of the modules described herein.

The at least one memory 310 may be configured to store data and/or information associated with the audio processing system 300. For example, the at least one memory 310 may be configured to store code associated with training a regressive (e.g., autoregressive) model for encoding audio (e.g., speech). For example, the at least one memory 310 may be configured to store code associated with teacher forcing regressive model training and removing noise from audio data used in the teacher forcing. The at least one memory 310 may be a non-transitory computer readable medium with code that when executed by the processor 305 cause the processor 305 to implement one or more of the techniques described herein. The at least one memory 310 may be a shared resource. For example, the model training system 300 may be an element of a larger system (e.g., a server, a personal computer, a mobile device, and the like). Therefore, the at least one memory 310 may be configured to store data and/or information associated with other elements within the larger system.

The controller 320 may be configured to generate various control signals and communicate the control signals to various blocks in the model training system 300. The controller 320 may be configured to generate the control signals to implement the techniques described herein. The controller 320 may be configured to control the evaluator and modifier 355 block to evaluate an objective function associated with a recursive model and to modify weights associated with the objective function in response to the evaluation. Modifying weights can be performed in response to determining whether the objection function eqn. 4 has been minimized during the training process.

As shown in FIG. 3, an audio stream 5 is input to the model training system 300. The sample 325 block can be configured to sample the audio stream 5. Sampling can include using a sampling rate S Hz to generate a discrete-time signal representing the audio stream 5.

The time domain separator 330 block can be configured to separate speech. In order to avoid the need for modeling summed independent signals, the sampled audio stream 5 can be processed with a real-time TasNet (time-domain audio separation network) in order to separate speech and/or suppress noise. A TasNet can apply a set of weighting functions (or masks) to separate the speech. In other words, to separate each speaker that may be heard in an utterance represented by the sampled audio stream 5, a weighted mask can be applied to the sampled audio stream. The result can be that the user (e.g., 105, 110) can be the focus of the audio processing system 200 by using a mask to isolate the user and filter out any background voices.

The converter 335 block can be configured to convert the separated audio stream into a sequence of log mel-spectra. These spectra can form the input to a conditioning stack, including a set of one-dimensional (1D) convolutional layers. A log mel-spectra can be a representation of the short-term power spectrum of the separated audio stream, based on a linear cosine transform of a log power spectrum on a nonlinear mel scale of frequency. A set of the resultant log mel-spectra can be stacked into a supervector. To quantify speech (e.g., an utterance) associated with the user (e.g., user 105, 110) the log mel-spectra can be adapted to a Gaussian mixture model to fit the user effectively shifting the means to some direction. The adaptation direction is a real valued vector that characterizes the user. This is sometimes called a supervector.

The transformer 340 block can be configured to apply a Karhunen-Loève transform (KLT) to the log mel-spectra (e.g., the supervector) corresponding to the audio stream 5.

The KLT is a linear transform where the basis functions are taken from the statistics of the signal (e.g., the log mel-spectra or supervector). The KLT can be an adaptive transform (e.g., adapt to the audio power). The KLT can be an optimal transform as relates to energy compaction. In other words, the KLT can place as much energy as possible in as few coefficients as possible.

The quantizer 345 block can be configured to quantize the energy (e.g., power or coefficients) associated with the transformed audio stream 5. For example, the transformed stacked log mel-spectra are encoded using split-vector quantization with a small number of coefficients per split. Quantization of energy can refer to assigning the energy (e.g., the transformed stacked log mel-spectra) to discrete energy levels. In split-vector quantization coefficients of the log mel-spectra or supervector can be split into p equal size groups. If the groups cannot be of equal size, then either the remaining coefficients can be added to one of the groups or the remaining coefficients can be put in their own smaller group.

Example implementations can include two techniques that can reduce the impact of data points in the training set that are difficult to predict (e.g., low probability data). A first technique can modify the maximum likelihood criterion by adding a term to the objective function that encourages low-variance predictive distributions. In other words, a regularization term can be used in the objective function to de-emphasize the influence of the outlier data (e.g., high differential entropy data) during the training of the model.

As discussed above with regard to equations (4)-(10), for signals that have uniform overall signal variance, setting a low predictive variance for regions that have relatively low conditional differential entropy may be desirable (e.g., for speech this would correspond to encouraging low variance for voiced speech only). This can be accomplished by a monotonically increasing concave function of the predictive variance. The logarithm can be used for this purpose because the logarithm can be invariant with scale.

A second technique for modifying the maximum likelihood criterion can be to prevent the vanishing support problem of the Kullback-Leibler divergence by using a baseline distribution as discussed above with regard to equation 12. In an example implementation, the distribution used for inference can be selected to have a low variance.

The reconstruct 350 block can be configured to generate an audio stream reconstruction of a corresponding encoded audio stream (e.g., a bitstream). The reconstruct 260 block can be configured to use a machine learned (ML) model to reconstruct an audio stream. The reconstruct 350 block can be configured to communicate the results from executing the objection function eqn. 4 to the evaluator and modifier 355 block.

The model training system 300 can be configured to train the ML model. Training the ML model can include training the ML model to generate a high-fidelity audio bitstream from a low bit rate input bitstream. The training of the ML model can include de-emphasizing the influence of low-probability distortion events in the sampled audio data on the trained ML model. For example, audio stream 5 can include noise. This noise can cause the low-probability distortion events in the sampled audio data. The de-emphasizing of the distortion events (e.g., minimizing the effect or impact of noise on the training of the ML model) is achieved by the inclusion of a term (e.g., a regularization term) in an objective function of the ML model. The term can encourage low-variance predictive distributions of a next sample in the sampled audio data. Accordingly, the ML model used in the reconstruct 350 block can include a modification to an objective function associated with the ML model. The objective function can include a regularization term that can reduce the effect of noise on the ML model.

Reducing the effect of noise when training a generative model can reduce the sensitivity of the model to distortion when the model is used to decompress an audio stream that includes some noise. For example, a cause of the sensitivity can be associated with an attribute of the log-likelihood (LL) objective function. The LL objective function can incur a penalty if the model assigns a low probability to observed data. Therefore, in the context of an autoregressive structure, assigning a low probability to observed data can encourage an overly broad predictive distribution when at least some training data are difficult to predict accurately from the past signal and conditioning. Therefore, the reconstruct 350 block can be configured to mitigate the effect of assigning a low probability to observed data on the LL objective function during the training of the ML model.

The ML model can include a regressive (e.g., autoregressive) network to generate the audio stream reconstruction of the input audio stream (e.g., reconstructed audio stream 5). The regressive network can include a multi-band WaveGRU that is based on gated recurring units. For an N-band WaveGRU, N samples can be generated simultaneously at an update rate of S/N Hz, one sample for each frequency band. For each update, the state of the gated recurring unit (GRU) network can be projected onto an N×K×3 dimensional space that defines N parameter sets. Each of the parameter sets can correspond to a mixture of logistics for a band. The value of a next signal sample for each band can be drawn by first selecting the mixture component (e.g., a logistics distribution) according to the bands probability and then drawing the sample from this logistics distribution by transforming a sample from a uniform distribution. For each set of N samples, a synthesis filter-bank can generate N subsequent time-domain samples. The time-domain samples can result in an output with sampling rate S Hz.

The evaluator and modifier 355 block can be configured to implement the training of the regressive model. In an example implementation, the training of the regressive model (e.g., as the GRU network and the conditioning stack) can be performed simultaneously using teacher forcing, in which past signal samples are provided as input to the model as ground-truth signal samples. The objective function of eqn. 4 can be used for each subsequent signal sample. The evaluator and modifier 355 block can evaluate the result of the objective function eqn. 4 from the current iteration against the result of the objective function eqn. 4 of at least one previous iteration of the training cycle. The evaluator and modifier 355 block can be configured to minimize the objective function including the regularization term eqn. 4, for example, with stochastic gradient descent or related methods, which can maximize the likelihood of the training data a indicated by eqn. 2.

If the result of the evaluation passes a criterion, the training can end. For example, the criterion can be based on minimizing the objective function eqn. 4. Should a modification of the weights result in a change in the result of the objective function being below a threshold, the evaluation can be deemed to pass the criterion. If the result of the evaluation fails the criterion, the regressive model can be modified (e.g., weights associated with the recursive model or GRU network can be changed), for example, with stochastic gradient descent or related methods, and the training can continue.

Figure 4:
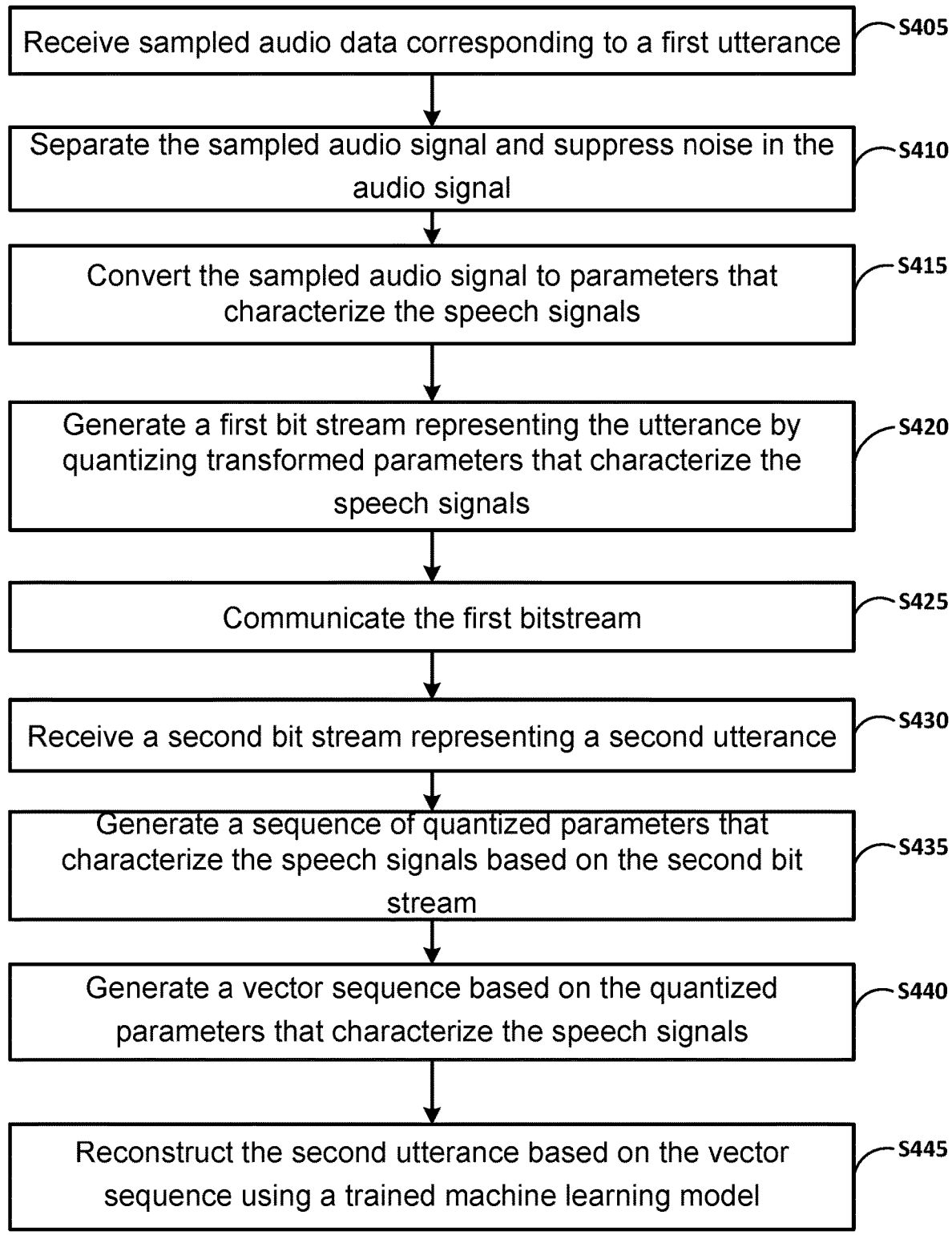
FIG. 4 illustrates a flowchart of a method for communicating audio according to at least one example embodiment.
Figure 5:
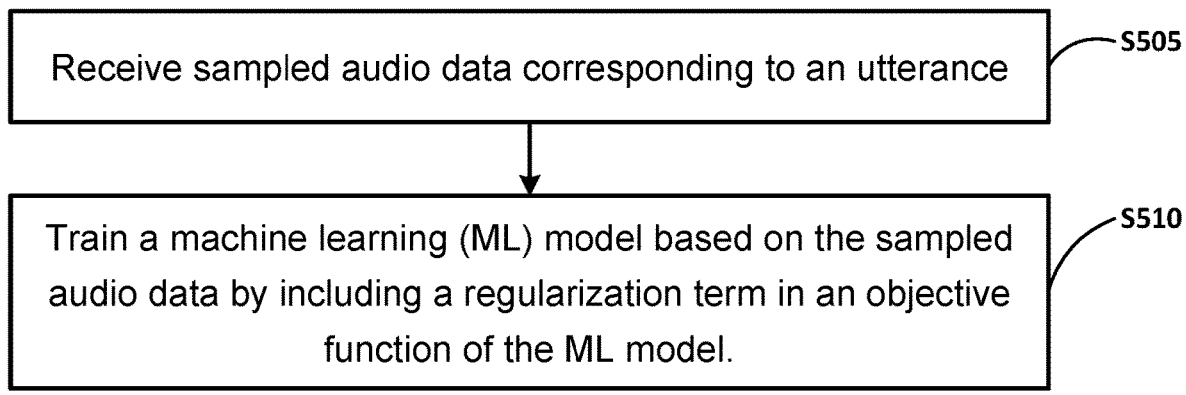
FIG. 5 illustrates a flowchart of a method for training a model according to at least one example embodiment.

FIGS. 4 and 5 are flowcharts of methods according to example embodiments. The methods described with regard to FIGS. 4 and 5 may be performed due to the execution of software code stored in a memory (e.g., a non-transitory computer readable storage medium) associated with an apparatus and executed by at least one processor associated with the apparatus.

However, alternative embodiments are contemplated such as a system embodied as a special purpose processor. The special purpose processor can be a graphics processing unit (GPU) and/or an audio processing unit (APU). A GPU can be a component of a graphics card. An APU can be a component of a sound card. The graphics card and/or sound card can also include video/audio memory, random access memory digital-to-analogue converter (RAMDAC) and driver software. The video/audio memory can be a frame buffer that stores digital data representing an image, a frame of a video, audio data associated with the frame, and/or streaming audio. A RAMDAC can be configured to read the contents of the video/audio memory, convert the content into an analogue signal and sends analog signal to a display/monitor and/or a speaker. The driver software can be the software code stored in the memory referred to above. The software code can be configured to implement the method described herein.

Although the methods described below are described as being executed by a processor and/or a special purpose processor, the methods are not necessarily executed by a same processor. In other words, at least one processor and/or at least one special purpose processor may execute the method described below with regard to FIGS. 4 and 5.

FIG. 4 illustrates a flowchart of a method for communicating audio according to at least one example embodiment. As shown in FIG. 4, in step S405 a sampled audio data corresponding to a first utterance is received at a first device. For example, an audio stream 5 can be sensed by a computing device 115, 120 executing a communications application 125, 130. The audio stream 5 can be sampled. For example, sampling can include using a sampling rate S Hz to generate a discrete-time signal representing the audio stream 5. The sampling rate can be directly proportional to the bit rate. Therefore, the lower the sampling rate the lower the bit rate. Therefore, the sampling rate can cause a compression of the audio stream 5. In other words, the lower the sampling rate S, the more compressed (holding the bit depth or the number of bits used to store the sampled audio stream 5 constant) the audio stream 5 may be. Therefore, the sampling rate S can be selected to enable (or help enable) the bit rate of the audio stream to be as low as, for example, 3 kb/s.

In step S410 the sampled audio signal is separated in the time domain and noise in the signal is suppressed. For example, the sampled audio stream 5 can be pre-processed with a real-time TasNet (time-domain audio separation network) in order to separate speech and to reduce noise. A TasNet can apply a set of weighting functions (or masks) to separate the speech and/or to suppress noise. In other words, to separate each speaker that may be heard and to suppress noise in an utterance represented by the sampled audio stream 5, a weighted mask can be applied to the sampled audio stream. The result can be that the user (e.g., user 105, 110) can be the focus of the audio processing by using a mask to isolate the user and filter out any background voices.

In step S415 the separated sampled audio signal is converted to parameters that characterize the speech signals. For example, the parameters that characterize the speech signals can be a sequence of vectors. For example, the separated audio stream can be converted into a sequence of log mel-spectra. These spectra can form the input to a conditioning stack, including a set of one-dimensional (1D) convolutional layers. A log mel-spectra can be a representation of the short-term power spectrum of the separated audio stream, based on a linear cosine transform of a log power spectrum on a nonlinear mel scale of frequency. A set of the resultant log mel-spectra can be stacked into a supervector. To quantify speech (e.g., an utterance) associated with the user (e.g., user 105, 110) the log mel-spectra can be adapted to a Gaussian mixture model to fit the user effectively shifting the means to some direction. The adaptation direction is a real valued vector that characterizes the user. This is sometimes called a supervector.

In step S420 a first bitstream representing the utterance is generated by quantizing transformed parameters that characterize the speech signals. For example, the sequence of vectors can be transformed. In an example implementation, a Karhunen-Loève transform (KLT) can be applied to the log mel-spectra (e.g., the supervector) corresponding to the audio stream 5. The KLT is a linear transform where the basis functions are taken from the statistics of the signal (e.g., the log mel-spectra or supervector). The KLT can be an adaptive transform (e.g., adapt to the audio power). The KLT can be an optimal transform as relates to energy compaction. In other words, the KLT can place as much energy as possible in as few coefficients as possible. For example, the energy (e.g., power or coefficients) associated with the transformed audio stream 5 can be quantized. The transformed stacked log mel-spectra can be encoded using split-vector quantization with a small number of coefficients per split. Quantization of energy can refer to assigning the energy (e.g., the transformed stacked log mel-spectra) to discrete energy levels. In split-vector quantization coefficients of the log mel-spectra or supervector can be split into p equal size groups. If the groups cannot be of equal size, then either the remaining coefficients can be added to one of the groups or the remaining coefficients can be put in their own smaller group.

In step S425 the first bitstream is communicated from the first device to a second device, for the second device to decode the bitstream and to synthesize an audio signal based on the decoded bitstream. For example, bitstream 10 as communicated from computing device 115 to computing device 120 can be the first bitstream.

In step S430 a second bitstream is received by the first device from the second device, the second bitstream representing speech signals of a second utterance. For example, a bitstream received by computing device 115 from computing device 120 can be the second bitstream, which then can be decoded and used to synthesize an audio signal using a trained machine learning model at the receiving computing device.

In step S435 a sequence of quantized parameters that characterize the speech signals is created based on the second bitstream. For example, a sequence of quantized log mel-spectra can be created based on the received bitstream. The sequence of quantized log mel-spectra should substantially match the transformed stacked log mel-spectra input to the quantizer of the computing device that generated the received bitstream for at least a portion of received bitstream.

In step S440 a vector sequence is generated based on inversely transforming the quantized parameters that characterize the speech signals. For example, a vector sequence can be created based on inversely transforming the quantized log-mel spectra. Then, the sequence of quantized log-mel spectra can be the input to a conditioning stack, including a set of one-dimensional (1D) convolutional layers. The 1D convolutional layers can include dilation except for the first convolutional layer. The output can be the vector sequence with a dimensionality equal to a gated recurring unit (GRU) state and a sampling rate can be equal to that of the mel-spectra of the encoder.

In step S445 the second utterance is regenerated based on the vector sequence using a trained regressive (e.g., autoregressive) network. For example, a regressive network can be used to create the audio stream reconstruction (e.g., reconstructed audio stream 5). The regressive network can include a multi-band WaveGRU that is based on gated recurring units. For an N-band WaveGRU, N samples can be created simultaneously at an update rate of S/N Hz, one sample for each frequency band. For each update, the state of the GRU network can be projected onto an N×K×3 dimensional space that defines N parameter sets. Each of the parameter sets can correspond to a mixture of logistics for a band. The value of a next signal sample for each band can be drawn by first selecting the mixture component (e.g., a logistics distribution) according to the bands probability and then drawing the sample from this logistics distribution by transforming a sample from a uniform distribution. For each set of N samples, a synthesis filter-bank can create N subsequent time-domain samples. The time-domain samples can result in an output (e.g., a reconstructed audio signal or utterance) with a sampling rate of S Hz. The reconstructed audio can be converted (e.g., using a digital to analog converter) to an analog audio signal for play-back on a speaker of the first device.

FIG. 5 illustrates a flowchart of a method for training a model according to at least one example embodiment. As shown in FIG. 5, in step S505 sampled audio data corresponding to an utterance is received. For example, a database including at least one dataset of speech segments (e.g., utterances) can be used as the audio data. Sampling can include using a sampling rate S Hz to create a discrete-time signal representing the audio data (e.g., audio stream 5). The sampling rate can be directly proportional to the bit rate. The database can be a publicly available database.

In step S510 a machine learning (ML) model is trained based on the sampled audio data by including a regularization term in an objective function of the ML model. Example implementations can include training the ML model to generate a high-fidelity audio bitstream from a low bit rate input bitstream. Training of the ML model can include de-emphasizing (e.g., minimizing the effect of) the influence of low-probability distortion events in the sampled audio data on the trained ML model. In other words, the effect of noise in the audio on the training of the ML model can be minimized. The de-emphasizing of the distortion events can be achieved by the inclusion of a term (e.g., the regularization term) in the objective function of the ML model. The term (e.g., the regularization term) can encourage the low-variance predictive distributions of a next sample in the sampled audio data.

Example implementations can include two techniques that can reduce the impact of data points in the training set that are difficult to predict (e.g., low probability data). A first technique can modify the maximum likelihood criterion by adding a term to the objective function that encourages low-variance predictive distributions.

As discussed above with regard to equations (4)-(10), signals that have uniform overall signal variance, setting low predictive variance for regions that have relatively low conditional differential entropy may be desirable (e.g., for speech that would correspond to encouraging low variance for voiced speech only). This can be accomplished by a monotonically increasing concave function of the predictive variance. The logarithm can be used for this purpose because the logarithm can be invariant with scale.

A second technique for modifying the maximum likelihood criterion can include preventing the vanishing support problem of the Kullback-Leibler divergence by using a baseline distribution as discussed above with regard to equation 12. In an example implementation, the distribution used for inference can be selected to have a low variance.

Prior to training the ML model, the sampled audio signal can be separated in the time domain. In an example implementation, separating speech can include noise suppression. For example, the sampled audio stream 5 can be pre-processed with a real-time TasNet (time-domain audio separation network) in order to separate speech and suppress noise. A TasNet can apply a set of weighting functions (or masks) to separate the speech and suppress noise. In other words, to separate each speaker that may be heard and suppress noise in an utterance represented by the sampled audio stream 5, a weighted mask can be applied to the sampled audio stream. The result can be that the user (e.g., user 105, 110) can be the focus of the audio processing by using a mask to isolate the user and filter out any background voices.

The separated sampled audio signal can be converted to parameters that characterize the speech signals. For example, the separated audio stream can be converted into a sequence of log mel-spectra. These spectra can form the input to a conditioning stack, including a set of one-dimensional (1D) convolutional layers. A log mel-spectra can be a representation of the short-term power spectrum of the separated audio stream, based on a linear cosine transform of a log power spectrum on a nonlinear mel scale of frequency. A set of the resultant log mel-spectra can be stacked into a supervector. To quantify speech (e.g., an utterance) associated with the user (e.g., user 105, 110) the log mel-spectra can be adapted to a Gaussian mixture model to fit the user effectively shifting the means to some direction. The adaptation direction is a real valued vector that characterizes the user. This is sometimes called a supervector.

The parameters that characterize the speech signals can be transformed. For example, a Karhunen-Loève transform (KLT) can be applied to the log mel-spectra (e.g., the supervector) corresponding to the audio stream 5. The KLT is a linear transform where the basis functions are taken from the statistics of the signal (e.g., the log mel-spectra or supervector). The KLT can be an adaptive transform (e.g., adapt to the audio power). The KLT can be an optimal transform as relates to energy compaction. In other words, the KLT can place as much energy as possible in as few coefficients as possible.

The energy (e.g., power or coefficients) associated with the transformed audio stream 5 can be quantized. For example, the transformed stacked log mel-spectra are encoded using split-vector quantization with a small number of coefficients per split. Quantization of energy can refer to assigning the energy (e.g., the transformed stacked log mel-spectra) to discrete energy levels. In split-vector quantization coefficients of the log mel-spectra or supervector can be split into p equal size groups. If the groups cannot be of equal size, then either the remaining coefficients can be added to one of the groups or the remaining coefficients can be put in their own smaller group.

Training the ML model can include reconstructing the utterance by inputting the quantized audio data (e.g., as compressed audio data or a low bit rate input bitstream) into a regressive (e.g., autoregressive) network, the regressive network can be based on gated recurring units. For example, a regressive (e.g., autoregressive) network can be used to generate the audio stream reconstruction (e.g., reconstructed audio stream 5). The regressive network can include a multi-band WaveGRU that is based on gated recurring units. For an N-band WaveGRU, N samples can be generated simultaneously at an update rate of S/N Hz, one sample for each frequency band. For each update, the state of the GRU network can be projected onto an N×K×3 dimensional space that defines N parameter sets. Each of the parameter sets can correspond to a mixture of logistics for a band. The value of a next signal sample for each band can be drawn by first selecting the mixture component (e.g., a logistics distribution) according to the bands probability and then drawing the sample from this logistics distribution by transforming a sample from a uniform distribution. For each set of N samples, a synthesis filter-bank can generate N subsequent time-domain samples. The time-domain samples can result in an output with sampling rate S Hz.

Training the ML model can further include modifying the regressive network based on comparing the reconstructed utterance to a ground-truth sample. For example, the regressive network can be modified based on the training of the regressive model. In an example implementation, the training of the regressive model (e.g., as the GRU network and the conditioning stack) can be performed simultaneously using teacher forcing, in which past signal samples are provided as input to the model as ground truth signal samples, and the model is trained to maximize the likelihood of the observed signal data, assuming the past signal samples represent ground truth data. Evaluation of the training of the model can be based on a cost or loss function. The cost or loss function can be used to evaluate the comparison against a predefined criterion. The cost or loss function can be, for example, a maximum likelihood estimation (MLE), a MLE and cross-entropy, a mean squared error (MSE), a logarithmic loss, and the like.

If the result of the loss function passes the criterion, the training can end. If the result of the loss function fails the criterion, the regressive model can be modified (e.g., weights associated with the recursive model or GRU network can be changed) and the training can continue. Accordingly, the past signal samples (e.g., sampled audio stream 5) can be ground-truth signal samples in a teacher forcing algorithm. The objective function eqn. (10), combining log likelihood (cross entropy) and variance regularization, can be used for each subsequent signal sample.

Training a machine learning (ML) model can include training the ML model to generate a high-fidelity audio bitstream from a low bit rate input bitstream. The training of the ML model can include de-emphasizing the influence of low-probability distortion events in the sampled audio data on the trained ML model. For example, utterances with noise can include noise that can cause the low-probability distortion events in the sampled audio data. The de-emphasizing of the distortion events (e.g., minimizing the effect or impact of noise on the training of the ML model) is achieved by the inclusion of a term (e.g., a regularization term) in an objective function of the ML model. The term can encourage low-variance predictive distributions of a next sample in the sampled audio data. Accordingly, the objective function with a regularization term can include a modification to an objective function associated with the ML model. The objective function can include a regularization term that can reduce the effect of noise on the ML model, and reducing the effect of noise can reduce the sensitivity of a generative model to distortion.

An example illustrating the performance of the trained ML model based on predictive variance regularization and noise suppression follows. This example uses eight systems, all being variants based on a single baseline system that operates with 16 kHz sampled signals. The baseline system was conditioned using a sequence of 160-dimensional log mel spectra computed from 80 ms windows at an update rate of 50 Hz. The system used four frequency bands, each band sampled at 4 kHz. The conditioning stack consisted of a single non-causal input layer (giving a 40 ms lookahead and expanding from 160 channels to 512 channels), three dilated causal convolutional layers with kernel size two, and three upsampling transpose convolutional layers (kernel size two). The conditioning outputs were tiled to match the GRU update frequency. The GRU state dimensionality was 1024. The eight systems differed in mixture-of-logistics components used for the predictive distribution per band.

The systems were trained from randomly initialized weights W for 7.5 million steps, using a mini-batch size of 256. The target signal and teacher forced autoregressive input audio from a combination of clean and noisy sources. In some cases, additional noise was added, with random signal-to-noise (SNR) ratios between 0 and 40 dB SNR.

Table 1 shows the combinations of coder attributes (i.e., variance regularization (v), noise suppression (t), quantization (q), and pruning) that were used for the eight systems (i.e., the systems labeled as "b" for baseline, and as "v", "t", "vt", "q", "qv", "qt", and "qvt"), and each attribute is discussed briefly below. The variance regularization was applied to the first two frequency bands only, and the parameter v in eqn. 4 was made proportional to a voicing score. The noise suppression was applied using a version of a fully-convolutional time-domain audio separation network (Conv-TasNet). The system was quantized with 120 bits per supervector, each supervector containing two log mel spectra, which implies a rate of 3 kb/s. The quantization was a two-dimensional vector-quantization of the KLT coefficients. The weight pruning attribute was selected to enable implementation of the model on consumer devices. For the three GRU matrices, block-diagonal matrices with 16 blocks were used, which uses 93% fewer weights than a fully connected model. For other hidden layers, iterative magnitude pruning was used to remove 92% of the model weights. The pruning makes the codec run reliably on user devices, such as a Pixel 2 phone, in single-threaded mode.

| system label | b | v | t | vt | q | qv | qt | qvt |
|---|---|---|---|---|---|---|---|---|
| variance regularization | | ✓ | | ✓ | | ✓ | | ✓ |
| Noise Suppression | | | ✓ | ✓ | | | ✓ | ✓ |
| 3 kb/s quantization | | | | | ✓ | ✓ | ✓ | ✓ |
| 93% pruning | | | | | ✓ | ✓ | ✓ | ✓ |

In this example, to evaluate the absolute quality of the different systems on different SNRs, a Mean Opinion Score (MOS) listening test was performed following the ITU-TP.800 recommendation. The data was collected using a crowd-sourcing platform with the requirements on listeners being native English speakers and using headphones. The evaluation dataset was composed of 30 samples from the Noisy VCTK dataset from the Centre for Speech Technology's Voice Cloning Toolkit, with 15 clean samples (i.e., samples without noise) and 15 samples augmented with additive noise at SNRs of 2.5 dB, 7.5 dB, and 12.5 dB. Each utterance for each system was rated about 40 times and the average and 95% confidence interval were calculated per SNR.

Figure 6A:
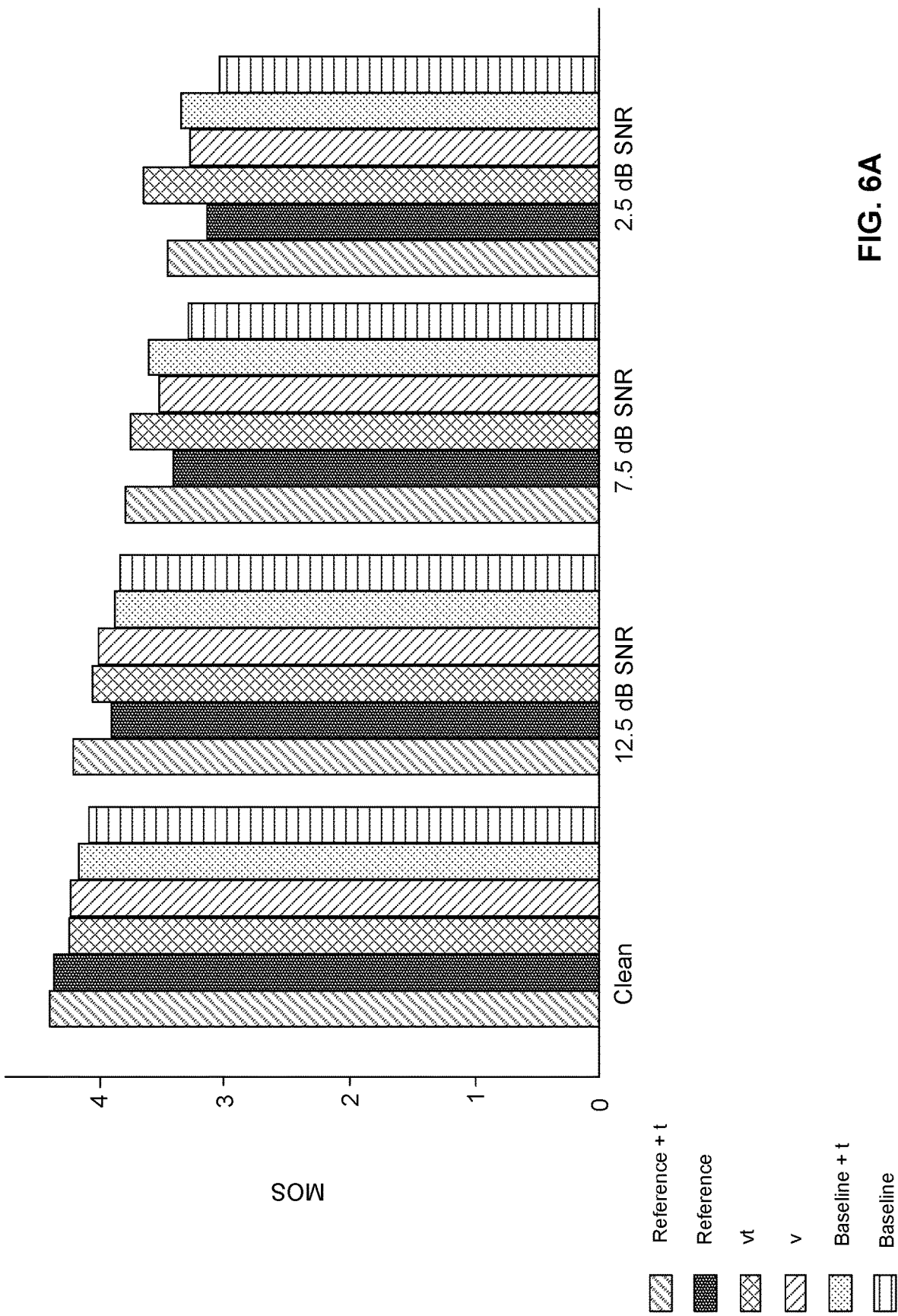
FIGS. 6A and 6B are graphs showing the relative performance of models using techniques described herein.
Figure 6B:
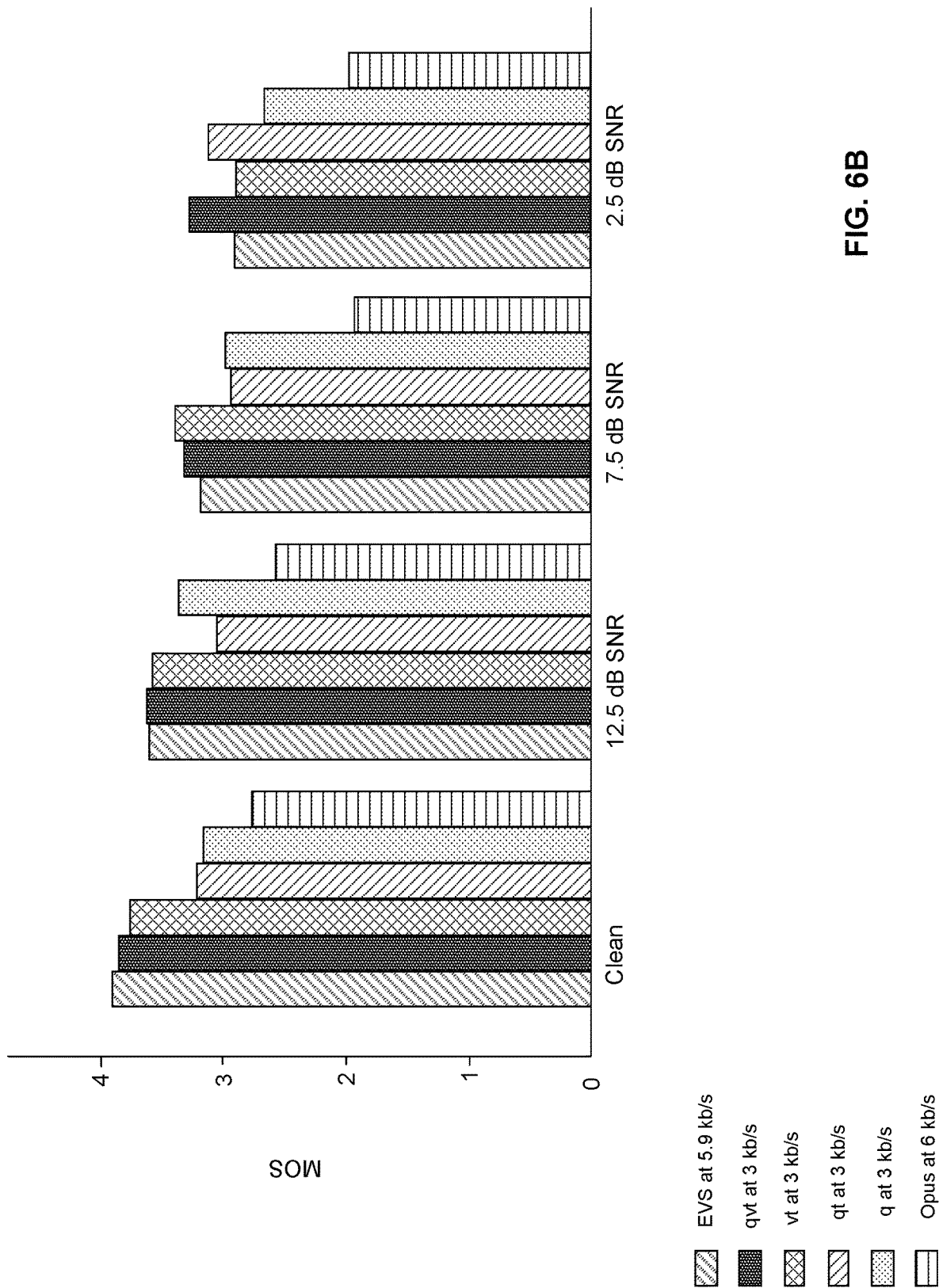

FIGS. 6A and 6B are graphs showing the quality, based on MOS values, for the systems of Table 1.

FIG. 6A displays the effect of predictive variance regularization and noise suppression without weight pruning and quantization. For each of the clean samples, and the samples with SNRs of 12.5 dB, 7.5 dB, and 2.5 dB MOS values are presented for: the baseline system (with and without noise suppression), the system with predictive variance regularization with and without noise suppression), and unprocessed signals as a reference (with and without noise suppression). As seen from FIG. 6A, predictive variance regularization results in a significant quality improvement and reduces the sensitivity to noise in the input signal. Noise suppression aids performance when noise is present.

FIG. 6B shows the quality for implementations that include pruning and quantization that may be used in consumer devices having finite processing power. For each of the clean samples, and the samples with SNRs of 12.5 dB, 7.5 dB, and 2.5 dB MOS values are presented for: the Opus codec operating at 6 kb/s; the generative model system at 3 kb/se with quantization; the generative model system at 3 kb/s with quantization and noise suppression; the generative model system at 3 kb/s with quantization and predictive variance regularization; the generative model system at 3 kb/s with quantization, predictive variance regularization, and noise suppression; and the EVS codec operating at 5.9 kb/s. As seen from FIG. 6B, the improvement of the generative model due to variance regularization is particularly large for clean signals. The effect of noise suppression varies in an unexpected manner with SNR, and likely results from an interaction between noise suppression and quantization, which may be related to noise suppression reducing signal variability and quantization reducing noise on its own. FIG. 6B illustrates that a 3 kb/s WaveGRU coder implementation (e.g., the generative model system at 3 kb/s with predictive variance regularization) performs significantly better than Opus at 6 kb/s and similarly to the EVS codec operating at 5.9 kb/s.

Figure 7:
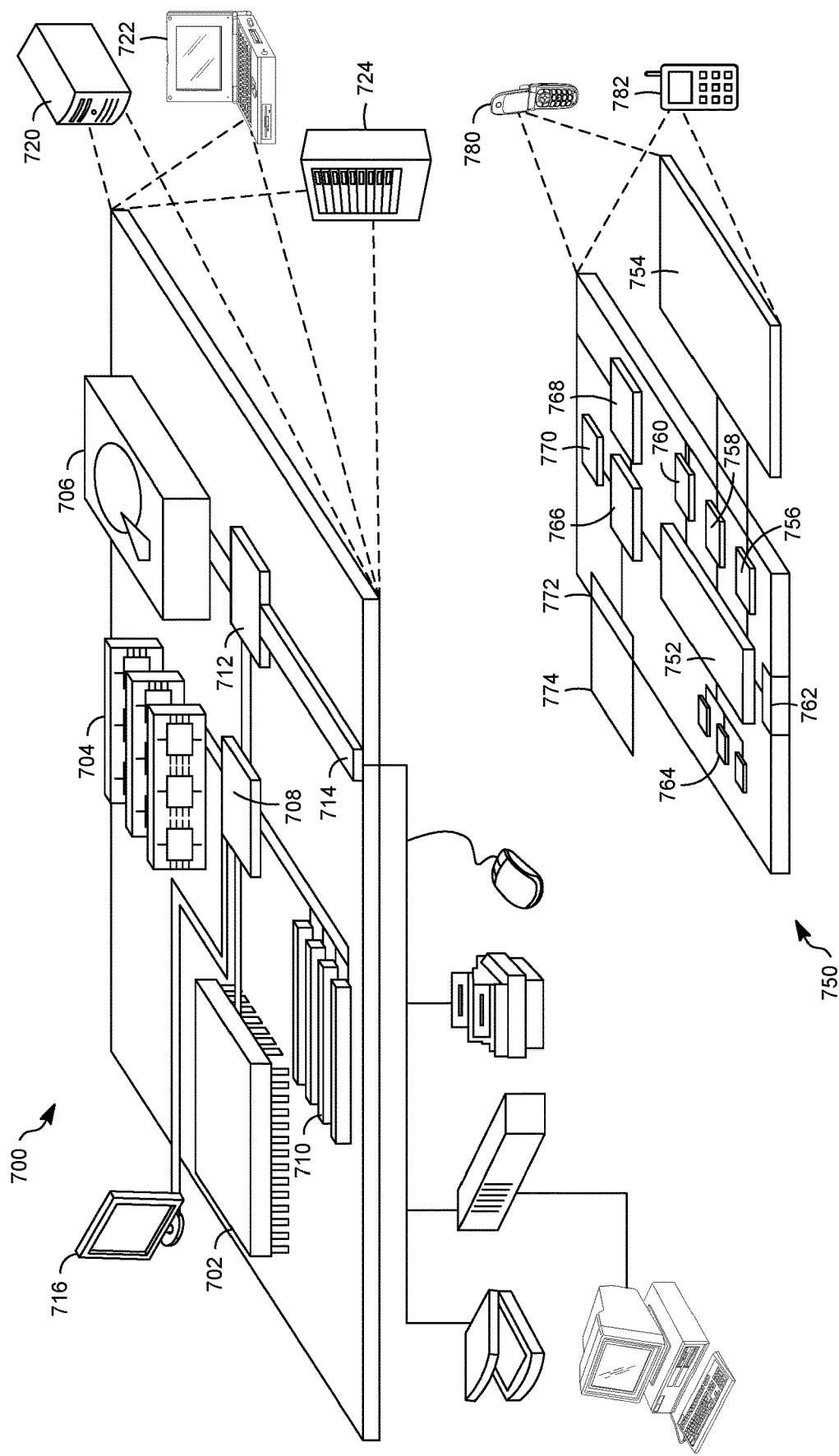
FIG. 7 shows an example of a computer device and a mobile computer device according to at least one example embodiment.

FIG. 7 shows an example of a computer device 700 and a mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750 or may also store applications or other information for device 750. Specifically, expansion memory 774 may include instructions to carry out or supplement the processes described above and may include secure information also. Thus, for example, expansion memory 774 may be provide as a security module for device 750 and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
receiving sampled audio data corresponding to utterances; and
training a machine learning (ML) model, using the sampled audio data, to generate a high-fidelity audio stream from a low bit rate input bitstream, wherein the training of the ML model includes de-emphasizing an influence of low-probability distortion events in the sampled audio data on the trained ML model, wherein the de-emphasizing of the influence of the low-probability distortion events is achieved by inclusion of a term in an objective function of the ML model, which term encourages low-variance predictive distributions of a next sample in the sampled audio data, based on previous samples of the sampled audio data.

2. The method of claim 1, wherein the term that encourages low-variance predictive distributions of a next bit in the low bit rate input bitstream includes a regularization term.

3. The method of claim 2, wherein the regularization term is defined as:

$$J_{var}(\{x\},W) = E_{data}\sigma_q^2, \text{ where}$$

W represents a vector of network parameter weights,
$\{x\}$ represents a sequence of the sampled audio data,
$E_{data}$ indicates averaging of a set of data in a database including the sampled audio data, and
$\sigma_q^2$ is predictive variance.

4. The method of claim 2, wherein the regularization term includes a logarithm as a monotonically increasing function of a predictive variance.

5. The method of claim 4, wherein the regularization term is defined as:

$$J_{var}(\{x\},W) = E_{data} \log(\sigma_q + a), \text{ where}$$

W represents a vector of network parameter weights,
$\{x\}$ represents a sequence of the sampled audio data,
$E_{data}$ indicates averaging of a set of data in a database including the sampled audio data,
$\sigma_q$ represents predictive variance, and
a represents a floor.

6. The method of claim 1, wherein the objective function includes a log-likelihood objective function and a regularization term and wherein the training of the ML model includes selecting weights of a network that minimize a predictive variance associated with the regularization term.

7. The method of claim 1, wherein the ML model is a regressive network.

8. The method of claim 1, wherein prior to training the ML model, the method further comprises:
separating the sampled audio data in a time domain;
converting the separated sampled audio data to a sequence of speech parameter vectors;
transforming the sequence of speech parameter vectors; and
quantizing the transformed sequence of speech parameter vectors.

9. A method of communicating an audio bitstream, the method comprising:
receiving, at a first device, sampled first audio data corresponding to first utterances;
converting the sampled first audio data into sequences of speech parameter vectors;
creating a first bitstream representing the first utterances by quantizing transformed sequences of the speech parameter vectors;
communicating, by the first device to a second device, the first bitstream;
receiving, at the first device from the second device, a second bitstream representing second utterances;
creating a sequence of speech parameter vectors based on the second bitstream;
creating a vector sequence based on inversely transforming the sequence of speech parameter vectors; and
generating, based on the vector sequence and by using a trained machine learning (ML) model, a high fidelity audio stream representing the second utterances, wherein the training of the ML model includes de-emphasizing an influence of low-probability distortion events in sampled training audio data on the trained ML model, wherein the de-emphasizing of the influence of the low-probability distortion events is achieved by inclusion of a term in an objective function of the ML model, which term encourages low-variance predictive distributions of a next sample in the sampled training audio data, based on previous samples of the sampled training audio data.

10. The method of claim 9, wherein the term that encourages low-variance predictive distributions of a next sample in the sampled training audio data includes a regularization term.

11. The method of claim 10, wherein the regularization term is defined as:

$$J_{var}(\{x\}, W) = E_{data} \sigma_q^2, \text{ where}$$

W represents a vector of network parameter weights,
{x} represents a sequence of sampled audio data,
$E_{data}$ indicates averaging of a set of data in a database including the sequence of sampled audio data, and
$\sigma_q^2$ is predictive variance.

12. The method of claim 10, wherein the regularization term includes a logarithm as a monotonically increasing function of a predictive variance.

13. The method of claim 12, wherein the regularization term is defined as:

$$J_{var}(\{x\}, W) = E_{data} \log(\sigma_q + a), \text{ where}$$

W represents a vector of network parameter weights,
{x} represents a sequence of sampled audio data,
$E_{data}$ indicates averaging of a set of data in a database including the sequence of sampled audio data,
$\sigma_q$ represents predictive variance, and
a represents a floor.

14. The method of claim 9, wherein the objective function includes a log-likelihood objective function and a regularization term and wherein the training of the ML model includes selecting weights of a network that minimize a predictive variance associated with the regularization term.

15. The method of claim 9, wherein the ML model is a regressive network.

16. A method comprising:
receiving sampled audio data corresponding to utterances; and
training a machine learning (ML) model, using the sampled audio data, to generate a high-fidelity audio stream from a low bit rate input bitstream, wherein the training of the ML model includes de-emphasizing an influence of low-probability distortion events in the sampled audio data on the trained ML model, wherein the de-emphasizing of the influence of the low-probability distortion events is achieved by an inclusion of a baseline distribution during training of the ML model, the baseline distribution being omitted during inference use of the ML model.

17. The method of claim 16, wherein the ML model includes a low variance distribution during inference.

18. The method of claim 16, wherein the baseline distribution includes a static gamma parameter and a broad logistic distribution.

19. The method of claim 18, wherein the inference use of the ML model is renormalized by a factor represented by $\gamma_k/(1-\gamma_0)$, where $\gamma_0$ is the static gamma parameter for the baseline distribution.

* * * * *